United States Patent [19]
Chen et al.

[11] Patent Number: 5,106,602
[45] Date of Patent: Apr. 21, 1992

[54] LOW TEMPERATURE CATALYTIC REDUCTION OF NITROGEN OXIDES

[75] Inventors: Jianping Chen, Buffalo; Ralph T. Yang, Williamsville, both of N.Y.; J. Edward Cichanowicz, Saratoga, Calif.

[73] Assignees: The Research Foundation of State University of New York, Albany, N.Y.; Electric Power Research Institute, Inc., Palo Alto, Calif.

[21] Appl. No.: 547,766

[22] Filed: Jul. 3, 1990

[51] Int. Cl.⁵ .......................... B01J 8/00; C01B 21/00
[52] U.S. Cl. ..................................... 423/239
[58] Field of Search ........................... 423/239, 239 A

[56] References Cited

U.S. PATENT DOCUMENTS

| | | | |
|---|---|---|---|
| 4,003,978 | 1/1977 | Shiraishi et al. | 423/239 |
| 4,089,930 | 5/1978 | Kittrell et al. | 423/239 |
| 4,119,568 | 10/1978 | Nishida et al. | 423/239 |
| 4,466,947 | 8/1984 | Imanari et al. | 923/239 |
| 4,695,437 | 9/1987 | Jung | 423/239 |
| 4,695,438 | 9/1987 | Becker et al. | 423/239 |

FOREIGN PATENT DOCUMENTS

| | | | |
|---|---|---|---|
| 52-21262 | 2/1977 | Japan | 423/239 |
| 2-187131 | 7/1990 | Japan | 423/239 |

Primary Examiner—Gregory A. Heller
Attorney, Agent, or Firm—Hughes & Multer

[57] ABSTRACT

Commercially viable processes of the SCR type for converting nitrogen oxides to nitrogen with ammonia: (a) in the presence of an iron, cobalt, nickel, or other transition metal sulfate with Brønsted activity; (b) at a temperature of not more than 250° C.; and (c) preferably in a dry environment if room or near room temperatures are employed. The process may be used to eliminate nitrogen oxides from flue gases, other exhaust gases, and the like and in other applications in which the reduction of a nitrogen oxide is wanted. Excess ammonia and/or sulfur dioxide may be maintained in the reaction mixture to promote process efficiency. The catalysts have appreciable Brønsted activity even at ambient temperatures and are capable of effecting $NO_x$ conversions with efficiencies of at least 50 percent in even demanding applications at temperatures below the 250° C. maximum. They can be unsupported or supported on a porous support. If of the latter type, the catalyst can be prepared by impregnating the support with an aqueous solution of a selected transition metal salt and then drying the impregnated support. Also, if the salt is not a sulfate, the salt is calcined and the resulting oxide reacted with a compound such as sulfur dioxide to generate the sulfate.

22 Claims, 4 Drawing Sheets

LOW TEMPERATURE CATALYTIC REDUCTION OF NITROGEN OXIDES

TECHNICAL FIELD OF THE INVENTION

The present invention relates to: (1) novel, improved catalysts for converting nitrogen oxides to nitrogen with ammonia and the preparation of those catalysts, and (2) novel methods which employ those catalysts and are carried out at significantly lower temperatures than heretofore disclosed selective catalytic reduction (SCR) processes.

The novel SCR processes and catalysts disclosed herein can be employed to particular advantage to eliminate nitrogen oxides from flue gases, other exhaust gases, and the like.

BACKGROUND OF THE INVENTION

Nitrogen oxides are major environmental pollutants, particularly in those circumstances in which they are found in large quantities—for example, in power plant flue gases. SCR-type processes for reducing these oxides to non-polluting nitrogen have already gained commercial acceptance in a number of countries; e.g., Germany and Japan. And SCR processes are presently under consideration in the United States.

The stoichiometry of the SCR reaction is:

$$4NH_3 + 4NO + O_2 \rightarrow 4N_2 + 6H_2O$$

Commercially available SCR catalysts are $V_2O_5$-based. An example is $V_2O_5/WO_3/TiO_2$. Other catalysts have also proven to be efficient under power plant flue gas conditions. These include H-form zeolites, transition metal oxides, and metal sulfates.

All of these catalysts have the drawback that the conversion must be carried out at a high—typically above 350° C.—temperature. In commercial power plants, this requires that the catalytic reactor be installed in what is certainly a non-optimal location from the viewpoints of capital investment and maintenance costs; viz., between the economizer section and air preheater of the steam generator. As a consequence of the required high reaction temperature and reactor location, it is expensive to eliminate nitrogen oxides from the gases when these heretofore disclosed catalysts are employed.

SUMMARY AND GENERAL DESCRIPTION OF THE INVENTION

We have now discovered that the selective catalytic conversion of nitrogen oxides to nitrogen can be carried out at much lower temperatures (<250° C.) and, consequently, at a significantly lower cost, by substituting for those discussed above, SCR catalysts comprising sulfates of the transition metals. The result is a significant cost savings can be realized.

Iron, cobalt, and nickel sulfates are preferred for their greater activity.

The catalyst can be employed in either a supported or unsupported form. The support, if the catalyst is supported, is employed primarily to provide a high surface area. Which support is employed is not critical as long as the support is porous and is physically and chemically stable at the reaction temperature. Supports fabricated from commercially available alumina, silica, and titania are all suitable.

The weight percent of the transition metal sulfate can range from 1–30 based on the total weight of the supported catalyst. The main criteria are that the surface of the support be covered and that the pores of the support not be blocked.

Supported catalysts are prepared by impregnating the selected support with an aqueous solution of the selected transition metal sulfate or with an aqueous solution of a nitrate or other thermally decomposable salt of the selected transition metal. The concentration of the aqueous solution may range from 0.01–10 normal. Repeated applications of the solution may be required if the solution is dilute.

After the impregnation step has been completed, the impregnated support is dried in those applications in which a transition metal sulfate is employed. Temperatures below those at which the sulfate will decompose for periods of at least 0.5 hour are used.

If the impregnant contains a salt other than a sulfate, the impregnated catalyst is dried as just described and then heated to a temperature (typically $\leq 600°$ C.) high enough to decompose the salt into the corresponding oxide. Sulfur dioxide and oxygen are then contacted with the oxide to convert the latter to the wanted transition metal sulfate.

The conversion of nitrogen oxides at room temperature with a catalyst as just described is preferably effected in a dry environment. At room temperature, water interferes with the reduction reactions and causes the SCR process to become less efficient. However, at about 100° C., moisture improves the conversion efficiency.

Excess ammonia and sulfur dioxide can advantageously be added to the reaction mixture as both produce an increase in process efficiency.

The optimum amount of ammonia is ca. twice the stoichiometric amount. Higher concentrations can perhaps be employed, but it is not expected that this would be beneficial.

Trace (ppm) amounts of sulfur dioxide are effective. There is no upper limit on the amount of sulfur dioxide that can be employed although care must be exercised as larger amounts are employed to ensure that the sulfur dioxide does not itself pollute the environment into which the treated gases are discharged.

The reactor in which the process is carried out may vary widely in character and appearance, depending upon the particular application of the invention. It need be nothing more than a simple tube of temperature resistant material with an inlet and an outlet and a section for the transition metal catalyst. It is preferred, however, that the reactor include, or have associated therewith, a temperature controlled heater for maintaining the wanted temperature in the reaction zone.

In power plants the conversion will typically, and preferably, be carried out at flue gas temperatures of 200°–350° F. (93°–177° C.). This allows the $NO_x$ conversion reactor to be conveniently located at the exit of the steam generator's air heater or in the base of the flue gas stack, in both cases minimizing capital investment and process costs. The potential for lower process cost is due in these instances to: (1) smaller flue gas volume, and (2) improved equipment access.

In general, however, the process is carried out at a temperature below 250° C. and preferably at a temperature in the range of 30°–180° C. or at a temperature in the range of 200°–250° C. Most preferred are temperatures in the range of 50°–120° C. and a temperature of ca. 225° C. Temperatures above 250° C. are avoided as the cost of maintaining the reaction temperature increases whereas there is a sharp drop in process efficiency.

The efficiency of the process can be calculated by the following $NO_x$ conversion algorithm:

$$NO_x \text{ Conversion} = ([NO_x]_{in} - [NO_x]_{out})/[NO_x]_{in}$$

Conversion efficiencies of 90 plus percent can be realized by employing reaction temperatures in the first 30°–180° C. range; and efficiencies remain close to 80 percent when temperatures in the second, 200°–250° C. range are employed. Even in demanding applications—for example, the cleaning of steam generator flue gases at process dictated temperatures in the 121°–167° C. range—useful $NO_x$ conversion efficiencies of 50 percent and higher are available.

In the power plant field alone, the principles of the present invention can be put to good use in any installation burning a coal, fuel oil, or other fuel containing sulfur. Outside of this field, there appear to be no limits on beneficial applications of the invention.

THE PRIOR ART

The generally accepted mechanism for the SCR reaction over a $V_2O_5$ catalyst involves an Eley-Rideal-type mechanism with the following sequential steps:

(1) chemisorption of $NH_3$ on a Brønsted acid site,
(2) binding of $NO_x$ to the chemisorbed $NH_3$,
(3) desorption of $N_2$ and $H_2O$, and
(4) oxidation of a surface hydroxyl group to a vanadyl group (see Iomata, M.; Miyamoto, A.; Murakami, Y., *J. Catal.* 1980, 62, 140). And we have shown that the SCR activity of $V_2O_5$ is directly related to the Brønsted activity of that compound (Yang, R. T.; Chen, J. P.; Buzanowski, M. A.; Cichanowicz, J. E., paper presented at 1989 Joint Symposium on Stationary Combustion $NO_x$ Control, San Francisco, CA (1989)). Also, the transition metal sulfates are known to possess Brønsted activity at low, even room temperatures (Tanaba, K. *Solid Acids and Bases*, Academic Press, New York (1970)).

However, it has not to our knowledge heretofore been disclosed, or even suggested, that transition metal sulfates can be employed to convert nitrogen oxides to relatively harmless nitrogen by selective catalytic reduction at low temperatures, let alone that this could be done efficiently enough to make the process worthy of consideration. Of course, we have not found anything disclosing or suggesting the form that the transition metal sulfate catalyst should take to make it useful for our purposes.

The following U.S. patents deal with the catalytic, initiator, or other additive promoted removal of nitrogen oxides from flue and other gases by SCR and competing processes: Patent

| U.S. Pat. No. | Patentee(s) | Issue Date |
|---|---|---|
| 4,081,509 | Hishinuma et al. | Mar. 28, 1978 |
| 4,101,634 | Ploeg | July 18, 1978 |
| 4,107,272 | Mori et al. | Aug. 15, 1978 |
| 4,612,175 | Harkness et al. | Sep. 16, 1986 |
| 4,645,653 | Kimura | Feb. 24, 1987 |
| 4,659,683 | Biffar et al. | Apr. 21, 1987 |
| 4,670,234 | Holter et al. | June 02, 1987 |
| 4,681,746 | Michalak et al. | July 21, 1987 |
| 4,725,222 | Koch | Feb. 16, 1988 |
| 4,732,744 | Chang et al. | Mar. 22, 1988 |
| 4,735,785 | Eichholtz et al. | Apr. 05, 1988 |
| 4,744,967 | Brand et al. | May 17, 1988 |
| 4,756,890 | Tang et al. | July 12, 1988 |
| 4,756,891 | Ohlmeyer et al. | July 12, 1988 |
| 4,782,039 | Lindsey | Nov. 01, 1988 |
| 4,782,771 | Bergkvist | Nov. 08, 1988 |
| 4,783,325 | Jones | Nov. 08, 1988 |
| 4,783,326 | Srednicki | Nov. 08, 1988 |
| 4,789,531 | Eichholtz et al. | Dec. 06, 1988 |
| 4,812,431 | Child | Mar. 14, 1989 |
| 4,824,647 | Scott | Apr. 25, 1989 |
| 4,839,148 | Ritter et al. | June 13, 1989 |
| 4,844,915 | Hooper | July 04, 1989 |
| 4,871,522 | Doyle | Oct. 03, 1989 |
| 4,875,436 | Smith et al. | Oct. 24, 1989 |

Compounds of transition metals are or can be employed in at least the Hishinuma et al., Harkness et al., and Chang et al. processes. However, there is no suggestion in any of these patents that the sulfates of the transition metals can be employed to eliminate nitrogen oxides from flue or other gases in which they are unwanted; that transition metal sulfates can be employed in SCR-type processes for this purpose; or that the sulfates of iron, cobalt, and nickel are particularly effective. Nor is there any suggestion of how these or other transition metal sulfates could be employed for in SCR process to reduce nitrogen oxides.

Figure 1:
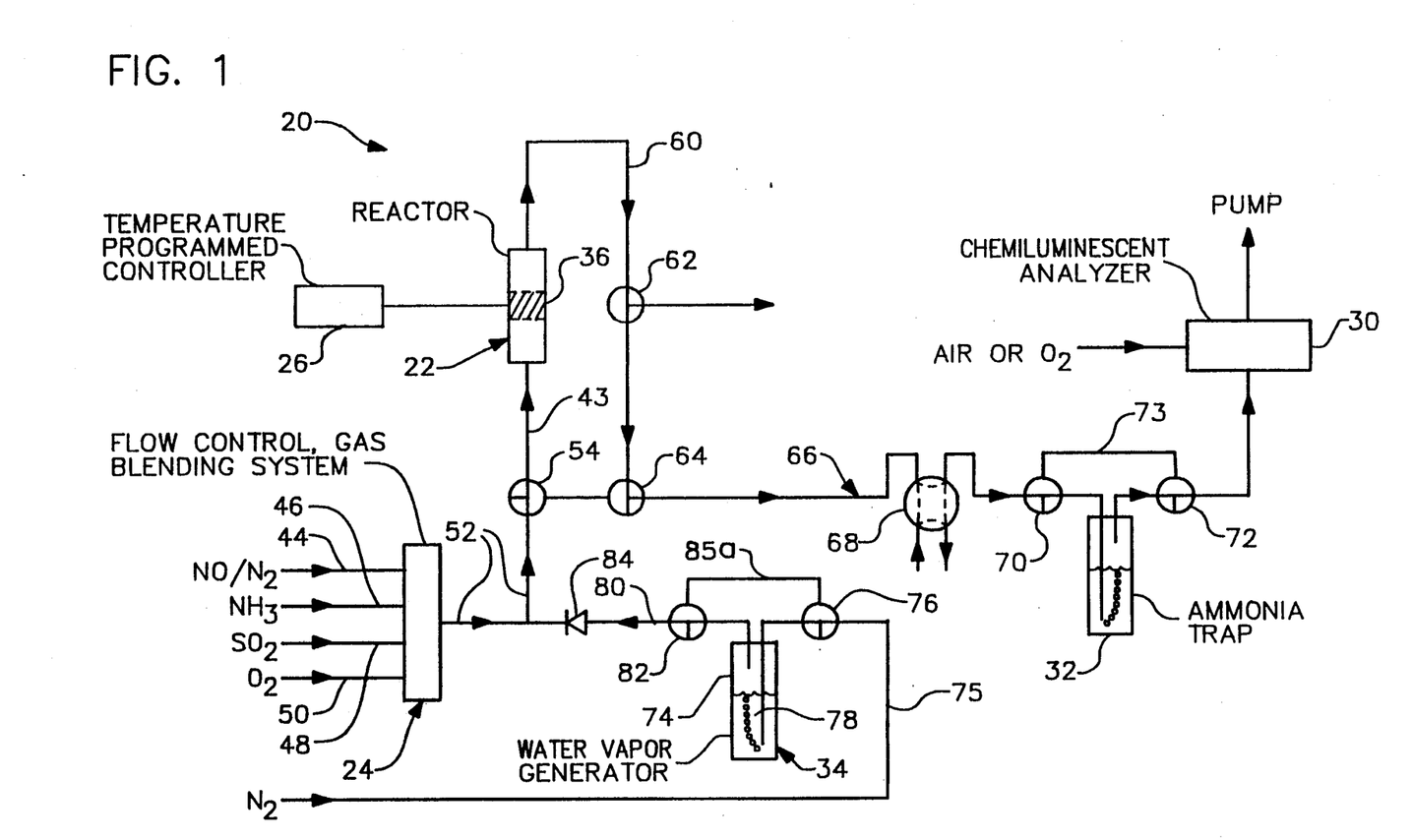
FIG. 1 is a schematic diagram of a system for converting nitrogen oxides in accord with the principles of the present invention.

The same is true of Mori et al. which is concerned with the conversion of nitrogen oxides over metal oxysulfur catalysts. FIG. 1 and Example 2 suggest that reaction temperatures of at least 350° C. are required for the efficient conversion of nitrogen by the patented process. There is, thus, no suggestion that any of the catalytic oxysulfur compounds disclosed in the patent would be efficient at the much lower maximum temperatures employed by applicants, let alone which ones of the many disclosed oxysulfur compounds could be so used or how the catalysts should be prepared for low temperature reactions. Nor, indeed, is there anything in Mori et al. which would lead one to suspect that, of all the disclosed oxysulfur compounds, the sulfates of the transition metals, and especially the sulfates of iron, cobalt, and nickel, would be the ones that can catalyze the conversion of nitrogen oxides at low temperatures.

OBJECTS OF THE INVENTION

From the foregoing, it will be apparent to the reader that one important and primary object of the present invention resides in the provision of novel, improved processes for ridding flue and other gases of nitrogen oxide pollutants and for otherwise converting nitrogen oxides whether that be done for pollution control or other purposes.

Related and also important but more specific objects of the present invention reside in the provision of processes as characterized in the preceding paragraph:

which are efficient;

which can be carried out at a lower temperature, and therefore at a lower cost, than heretofore disclosed, related processes for reducing nitrogen oxides; and which employ the SCR conversion of nitrogen oxides to nitrogen in the presence of a transition metal sulfate-based catalyst.

Still other important objects of the present invention reside in the provision of novel, improved catalysts for the just-characterized processes and in the provision of methods for preparing those catalysts.

Still other important objects, advantages, and features of the invention will be apparent to the reader from the foregoing and the appended claims and as the ensuing detailed description of the invention proceeds in conjunction with the accompanying drawing.

DETAILED DESCRIPTION OF THE INVENTION

Referring now to the drawing, FIG. 1 depicts a representative system 20 which may be employed to convert nitrogen oxides to relatively harmless nitrogen with ammonia and oxygen in the presence of a transition metal sulfate in accord with the principles of the present invention.

The major components of system 20 include a reactor 22 and a mass flow control and blending system 24. The latter supplies a reactant mixture to reactor 22.

Also included in system 20 is a programmable temperature controller 26. This piece of equipment controls the temperature at which the nitrogen oxide conversion reactions are carried out in reactor 22 by way of a tubular furnace 28 closely surrounding the reactor.

In the interest of gathering data demonstrating the efficiency of the present invention, system 20 was also instrumented with a flowmeter (not shown) and a chemiluminescent $NO_x$ analyzer 30.

Other major components of system 20 are an ammonia scrubber 32 and a water vapor generator 34.

Figure 2:
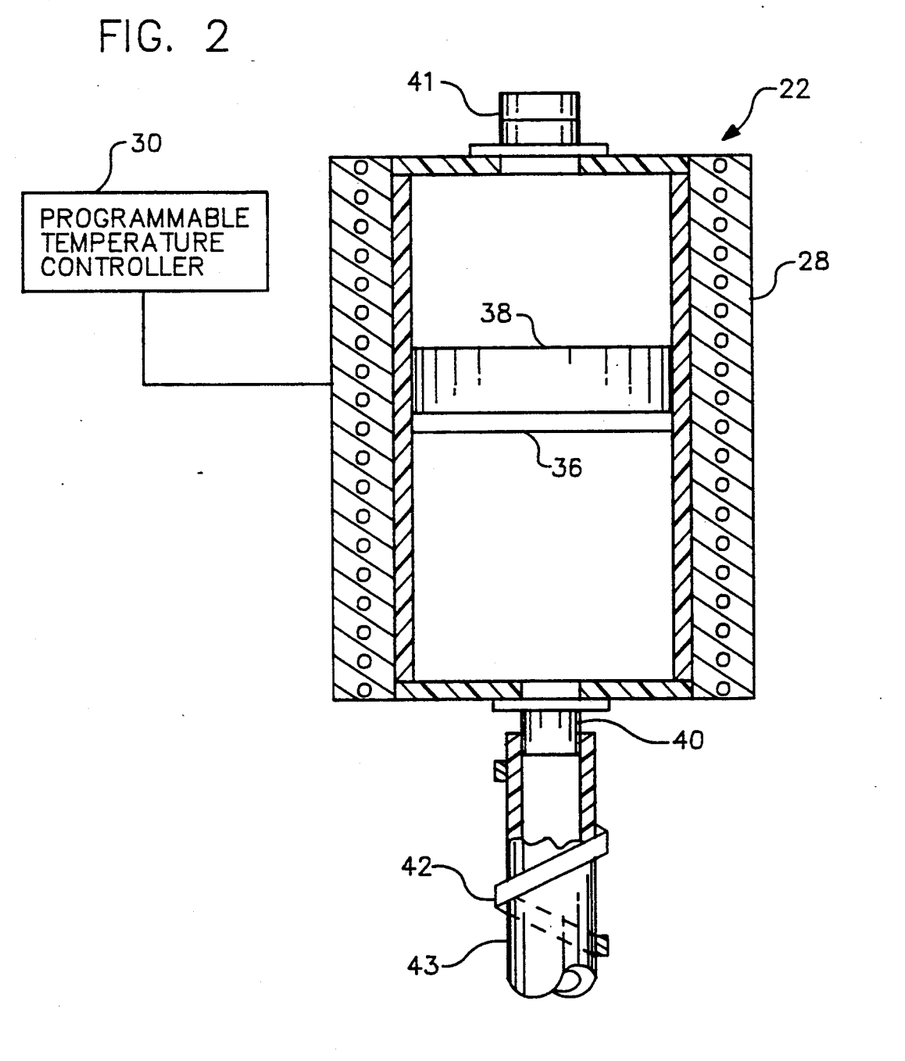
FIG. 2 is a more detailed but still schematic illustration of a reactor employed in the system of FIG. 1.

In the illustrated system 20, reactor 22 is a quartz tube with a fritted glass support 36 for a bed 38 of transition metal sulfate catalyst. The reactor has an inlet 40 for the reactant mixture and an effluent outlet 41. Heating tape 42 wound around reactant mixture inlet line 43 preheats the reactant mixture supplied to reactor 22 through inlet 40.

Mass flow control and blending system 24 was obtained from Linde and is identified by that company as Model FM 4575. Inlet lines 44...50 respectively supply the following to system 24: (1) a $NO_x/N_2$ mixture; (2) ammonia; (3) sulfur dioxide; and (4) oxygen.

A line 52 with a value 54 transfers the reactant mixture from flow control and blending system 24 to the reactor inlet line 43.

In reactor 22, nitrogen oxides in the mixture thus supplied to the reactor are converted over the catalyst 38 on support 36 with ammonia to nitrogen gas by way of the reactions previously set forth above. As mentioned above, a selected temperature is maintained in the reaction zone by furnace 28 under the control of temperature controller 26. The details of the furnace and controller are not part of the present invention or needed to understand it. Those details will therefore not be found in this specification.

The reduced nitrogen oxide content effluent from reactor 22 is outputted through outlet 41 and line 60. Valves 62 and 64 in line 60 allow the effluent to be routed to a flowmeter (not shown) employed in assessing the performance of system 20.

Otherwise, the valves in line 60 allow the effuent to be recirculated through reactor 22 for further nitrogen oxide conversion or routed through lines collectively identified by reference character 66 and a vent valve 68 to gas analyzer 30. This analyzer is employed to evaluate the composition of the effluent. It is of the chemiluminescent $NO/NO_x$-type; it was obtained from Thermo Electron Corporation and is that company's Model 10.

Before reaching analyzer 30, the effluent from reactor 22 is scrubbed with a concentrated, aqueous solution of phosphorous acid in ammonia trap 32, which is a device of conventional construction. This eliminates errors in process efficiency calculations that might be caused by the oxidation in analyzer 30 of ammonia present in the effluent exhausted from reactor 22.

Valves 70 and 72 allow the ammonia trap to be isolated and to be bypassed through line 73.

As mentioned above, the illustrated, exemplary nitrogen oxide conversion system 20 also includes a water vapor generator 34. This was provided so system 20 could be employed to demonstrate the above-discussed adverse effects of water vapor on conversion efficiency. The particular, illustrated, water vapor generator is a wash bottle 74 filled with distilled water.

Water vapor is generated by passing nitrogen gas from input line 75 through valve 76 and then through the water 78 in wash bottle 74. The water vapor is circulated through lines collectively identified by reference character 80, valve 82, and check valve 84 to that line 52 which transfers the reactant mixture from flow control and blending system 24 to reactor 22. The water vapor is mixed into the reactant mixture as it and the mixture flow through line 52.

Valves 76 and 82 allow water vapor generator 34 to be isolated and bypassed through line 85a. Check valve 84 keeps the reactant mixture that system 24 outputs from flowing to water vapor generator 34 instead of reactor 22.

The catalysts of reactor bed 38 in representative tests were alumina-supported Fe, Co, and Ni sulfates. The porous alumina support (Kaiser Chemicals, A-305CS) was in the form of pellets (20–32 mesh) with a BET (Brunauer, Emmett, Teller) surface area of 341 $m^2/g$.

The initial step in making the catalysts was to impregnate the porous alumina supports with aqueous solutions of selected transition metal sulfates (Fe, Co, and Ni).

The impregnated pellets are dried at 120° C. for 15 hours. The dried catalyst samples were immediately capped and were then ready for use.

The sulfate content was 10 weight percent of the combined weight of the catalyst and support on a water-free basis.

In other instances, the impregnants were aqueous solutions of iron, cobalt, and nickel nitrates. The impregnated pellets were dried as just discussed. Then, the catalysts were calcined and sulfated with sulfur dioxide as detailed above.

In tests which employed system 20 to confirm the effectiveness of a 10 weight percent $NiSO_4.H_2O/Al_2O_3$ catalyst prepared in the manner just described, the reactant gas was a mixture simulating flue gas. The flow rates were controlled by, and the reactant mixture generated in, mass flow control and blending system 24. The "basic" gas mixture had the following composition: 500 ppm NO, 1,000 ppm $NH_3$, 500 ppm $SO_2$, 2% $O_2$, and balance $N_2$. The space velocity was 7,500 $hr^{-1}$ based on room temperature and 1 atmosphere of pressure.

The nitrogen was oxygen-free grade (<0.5 ppm $O_2$). The ammonia was anhydrous grade (99.99%), and the oxygen was ultrahigh-purity grade (99.99% minimum).

The effluent from reactor 22 was scrubbed in ammonia trap 32 to eliminate possible errors attributable to $NH_3$ oxidation in chemiluminescent analyzer 30.

SCR activity was measured by the $NO_x$ conversion algorithm set forth above.

Figure 3:
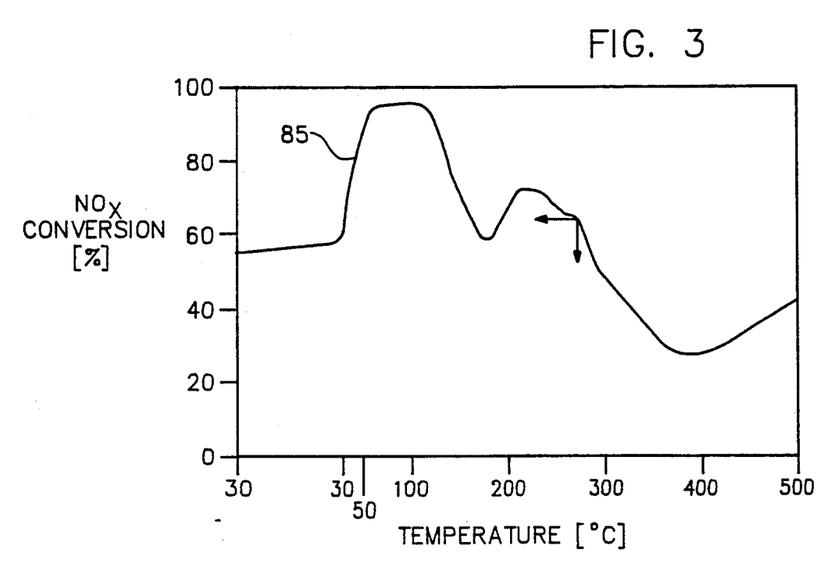
FIG. 3 shows the effect of temperature on the conversion of nitrogen oxides to nitrogen by the novel SCR processes disclosed herein.

The temperature programmed reaction (TPR) results of reacting nitric oxide with ammonia in system 20 and over the SCR nickel sulfate catalyst 38 just described are shown in graphic form by curve 85 in FIG. 3 as $NO_x$ conversion versus temperature at a heating rate of 2° C./minute. Prior to heating it at this rate, reactor 22 was maintained at 30° C. As the reaction zone temperature was then increased, $NO_x$ conversion increased rapidly with temperature, exceeding 90% with the reaction zone temperature in the range of 57° to 105° C. Further increases in temperature resulted in a decline of $NO_x$ conversion efficiency, conversion dropping to a minimum of 60% at 180° C.

However, a second peak in activity appeared upon further heating. Activity began to increase significantly at a temperature ca. 200° C., reaching a maximum of nearly 80% at 225° C. As the temperature was increased beyond 225° C., the SCR activity displayed a modest decline until a reaction temperature of 250° C. was reached, then a sharp decline, followed by a 44% conversion plateau at 500° C.

The surface acidity and crystalline structure of $NiSO_4.H_2O$ have been extensively studied. At 30° C., this compound has the hydrated form $NiSO_4.7H_2O$. This hydrated nickel sulfate would not be expected to have significant Brønsted acidity at 30° C. and would therefore not be expected to promote the SCR conversion of nitrogen oxides at this temperature. We have, however, unexpectedly found, and confirmed, that transition metal sulfate catalysts such as the alumina supported nickel sulfate used in those tests generating the data of FIG. 3 are effective at low —e.g., 30° C.—temperatures.

As discussed above, it is preferred that the $NO_x$ conversion reactions be carried out in the absence of water to the extent that this is practical. We postulated that adsorption of water by the transition metal sulfate catalyst would reduce the Brønsted acidity and, hence, decrease the SRC activity of the catalyst. This was indeed the case.

Figure 4:
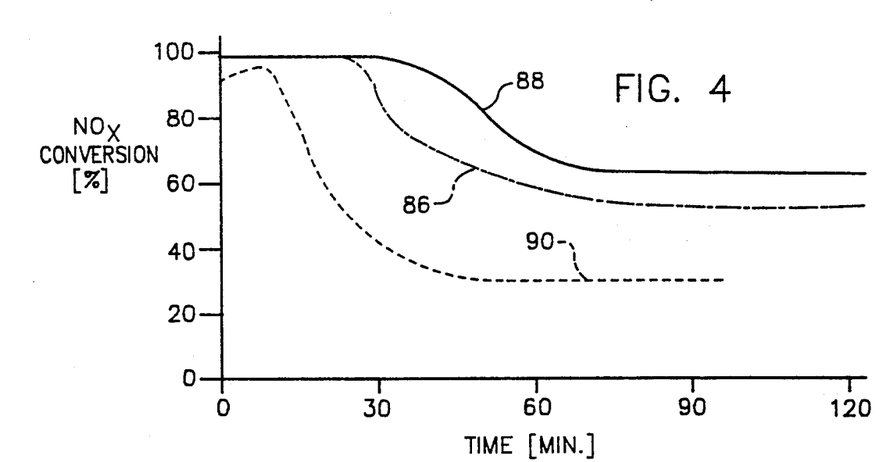
FIG. 4 shows the effect of time on the conversion rates afforded by those processes.

FIG. 4 shows the results of tests involving the $NO_x$ conversion on fresh $NiSO_4/Al_2O_3$ catalysts under "dry" and "wet" conditions. Curve 86 is the conversion at 30° C. without the addition of water vapor. The conversion efficiency was over 90% during the initial 25 minutes. This was followed by a slow decline to a steady conversion value of 50%. As the water molecule is a product of the SCR reaction, this decline in SCR activity can probably be attributed to the accumulation of the surface water produced from the reaction.

Curve 88 shows the results at 50° C., also in a "dry" reaction zone. The steady $NO_x$ conversion of 60% was reached at the two hour point. The higher steady activity at 50° C. is attributed to lower water absorption by the catalyst at the higher temperature.

Water vapor in the reaction mixture lowered the $NO_x$ conversion rate. Curve 90 shows the results obtained with 2.2% $H_2O$ in the inlet gas. The SCR activity decreased rapidly and stabilized at a conversion rate of only 30%.

Figure 5:
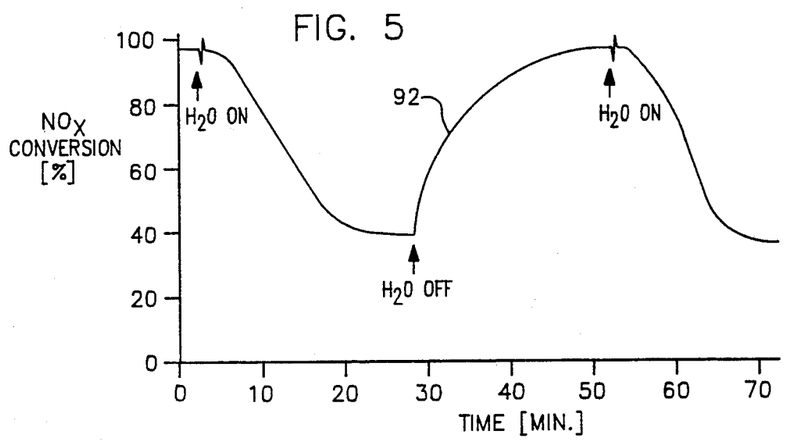
FIG. 5 shows the effect on those processes of water in the reaction mixture.

However, we have discovered that the SCR activity of the transition metal sulfate can be restored by removing the water vapor from the reactant mixture as shown by curve 92 in FIG. 5. This result is one of obvious importance from the the practical point-of-view.

In the "wet" tests, the composition of the reaction mixture was: NO=$SO_2$=500 ppm, $NH_3$=1,000 ppm, $O_2$=2%, $H_2O$=2.2%, s.v. (space velocity)=7,500 $hr^{-1}$. The water vapor was generated in the manner described above.

We pointed out previously that the conversion of nitrogen oxides in the manner disclosed herein can be promoted by maintaining an excess of ammonia in the reaction zone.

As one representative example, the effects of $NH_3$ concentration in the SCR activity of $NiSO_4/Al_2O_3$ at 50° C. are shown in Table 1 under both "dry" and "wet" conditions.

TABLE 1

EFFECTS OF AMMONIA CONCENTRATION ON $NO_x$ CONVERSION

| $NH_3$ Concentration (ppm) | $NO_x$ Conversion (%) Without $H_2O$ vapor in the reactant mixture | With $H_2O$ vapor in the reactant mixture |
|---|---|---|
| 250 | 14 | 24 |
| 500 | 21 | 24 |
| 1,000 | 52 | 20 |
| 1,500 | 76 | 20 |
| 2,000 | 88 | 20 |

Reaction conditions: NO = 500 ppm, $SO_2$ = 500 ppm, $O_2$ = 2%, $N_2$ balance, Temperature = 50° C., $H_2O$ = 2.2%, GHSV (space velocity) = 7,500 $hr^{-1}$.

Under dry conditions, an increase in ammonia concentration beyond the stoichiometric ratio for the SCR reaction ($NH_3$/NO=1) increased the $NO_x$ conversion efficiency severalfold in the "dry" reaction zone. Under "wet" conditions, the Brønsted acidity of the transition metal sulfate catalyst was low; and the SCR activity was not influenced by the ammonia concentration.

It was also pointed out above that sulfur dioxide ($SO_2$) has a promoting effect on the transition metal sulfate catalyst-employing, $NO_x$ conversion processes disclosed herein. This gives the present invention yet another advantage over those heretofore disclosed SCR processes employing $V_2O_5$- and zeolite-based catalysts.

Figure 6:
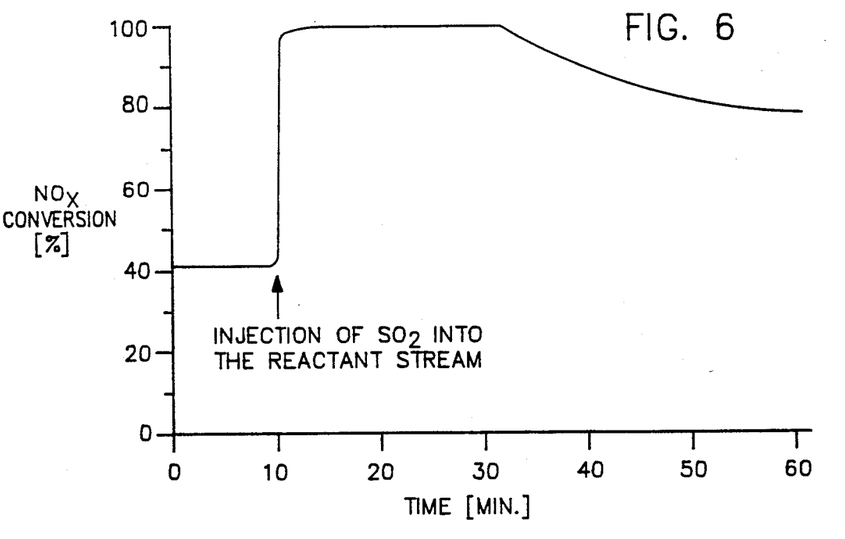
FIG. 6 shows the effect of sulfur dioxide ($SO_2$) on the conversion rate.

The $NO_x$ conversion-promoting effect of $SO_2$ on the low-temperature activity of $NiSO_4/AL_2O_3$ catalysts is shown for a 30° C. reaction temperature by curve 94 in FIG. 6. The $NO_x$ conversion rate increased from 42% before $SO_2$ injection to 98% instantly upon $SO_2$ injection ten minutes after the test was started. Conversion efficiency then declined slowly but stabilized at a very useful 82 percent.

The reactant mixture employed in the "SO₂" tests supplied to the reaction zone was constituted as follows: NO=SO$_2$=500 ppm, NH$_3$=1,000 ppm, O$_2$=2%, N$_2$=balance, s.v. =7,500 hr$^{-1}$, T=30° C.

Tests at 100° C. showed a NO conversion of 50 percent under "wet" conditions; and the activity was maintained in a 31-hour run with no decline. However, the activity was lower under "dry" conditions at the same temperature.

The invention may be embodied in forms other than those disclosed above without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A process for converting a nitrogen dioxide to nitrogen which includes the steps of:
   providing a reaction zone;
   providing in the reaction zone a catalyst comprising a transition metal sulfate which has sufficient Brønsted activity to effect NO$_x$ conversion with an efficiency of at least 50 percent at a temperature of not more than 250° C.;
   maintaining the temperature in the reaction zone at a maximum of less than 250° C.;
   introducing the nitrogen oxide into the reaction zone and into the presence of the catalyst;
   introducing ammonia into the reaction zone and into the presence of the catalyst in a manner and amount effective to reduce to nitrogen the nitrogen oxide introduced into said zone;
   maintaining sulfur dioxide in the reaction zone and in the presence of the nitrogen oxide and the ammonia in an amount which is effective to promote the conversion of the nitrogen oxide; and
   reacting said nitrogen oxide with the ammonia and oxygen in the presence of said catalyst to bring about the wanted conversion of the nitrogen oxide.

2. A process as defined in claim 1 in which sulfur dioxide is maintained in the environment in which the conversion is carried out in a concentration approximating the concentration of the nitrogen oxide in said zone.

3. A process as defined in claim 1 in which the conversion is carried out at a temperature in the range of 30°-180° C.

4. A process as defined in claim 3 in which the conversion is carried out at a temperature in the range of 50°-120° C.

5. A process as defined in claim 1 in which the conversion is carried out at a temperature in the range of 200°-250° C.

6. A process as defined in claim 5 in which the conversion is carried out at a temperature of about 225° C.

7. A process as defined in claim 1 in which the conversion is carried out at a room or near room temperature in an essentially water-free environment.

8. A process as defined in claim 1 in which ammonia is maintained in the reaction mixture in an amount ranging from 100 to 200 percent based on the stoichiometric amount.

9. A process as defined in claim 8 in which the concentration of ammonia in the reaction mixture is about 200 percent of stoichoimetric.

10. A process as defined in claim 1 in which the catalyst is supported.

11. A process as defined in claim 1 in which the catalyst comprises an iron, cobalt, or nickel sulfate.

12. A method of removing a nitrogen oxide from a flue gas or other exhaust gas or the like which comprises the steps of:
   providing a reaction zone;
   providing in the reaction zone a catalyst comprising a transition metal sulfate which has sufficient Brønsted activity to effect NO$_x$ conversion with an efficiency of at least 50 percent at a temperature of not more than 250° C.;
   maintaining the temperature in the reaction zone at a maximum of less than 250° C.;
   introducing the nitrogen oxide-containing gas into the reaction zone and into the presence of the catalyst;
   introducing ammonia into the reaction zone and into the presence of the catalyst in a manner and amount effective to reduce to nitrogen the nitrogen oxide in the gas introduced into said zone;
   maintaining sulfur dioxide in the reaction zone and in the presence of the nitrogen oxide-containing gas and the ammonia in an amount which is effective to promote the conversion of the nitrogen oxide; and
   reacting the nitrogen oxide in said gas with the ammonia and oxygen in the presence of said catalyst to bring about the wanted reduction of the nitrogen oxide to thereby remove said oxide from said gas.

13. A process as defined in claim 12 in which sulfur dioxide is maintained in the environment in which the conversion is carried out in a concentration approximating the concentration of the nitrogen oxide in the gas containing said oxide.

14. A process as defined in claim 12 in which the conversion is carried out at a temperature in the range of 30°-180° C.

15. A process as defined in claim 14 in which the conversion is carried out at a temperature in the range of 50°-120° C.

16. A process as defined in claim 12 in which the conversion is carried out at a temperature in the range of 200°-250° C.

17. A process as defined in claim 16 in which the conversion is carried out at a temperature of about 225° C.

18. A process as defined in claim 12 in which the conversion is carried out at a room or near room temperature in an essentially water-free environment.

19. A process as defined in claim 12 in which ammonia is maintained in the reaction mixture in an amount ranging from 100 to 200 percent based on the stoichiometric amount.

20. A process as defined in claim 19 in which the concentration of ammonia in the reaction mixture is about 200 percent of stoichoimetric.

21. A process as defined in claim 12 in which the catalyst is supported.

22. A process as defined in claim 12 in which the catalyst comprises an iron, cobalt, or nickel sulfate.

* * * * *

UNITED STATES PATENT AND TRADEMARK OFFICE
CERTIFICATE OF CORRECTION

PATENT NO. : 5,106,602
DATED : April 21, 1992
INVENTOR(S) : Jianping Chen, et. al.

It is certified that error appears in the above-indentified patent and that said Letters Patent is hereby corrected as shown below:

Column 2, line 20, change "$\leq 600°C$." to --$\leq 600°C$.--

Column 6, line 10, change "effuent" to --effluent--.

Column 7, line 13, change "99.99%" to --99.9%--.

Signed and Sealed this

Nineteenth Day of July, 1994

Attest:

BRUCE LEHMAN

Attesting Officer

Commissioner of Patents and Trademarks